(12) United States Patent
Liu et al.

(10) Patent No.: US 9,632,218 B2
(45) Date of Patent: Apr. 25, 2017

(54) TWO-IN-ONE TRANSLUCENT AND COLORED FILM

(71) Applicant: Avery Dennison Corporation, Glendale, CA (US)

(72) Inventors: Xiang Liu, Mentor, OH (US); Michael Ramsay, Newbury, OH (US); Steven Reekmans, Leuven (BE)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/806,838

(22) Filed: Jul. 23, 2015

(65) Prior Publication Data

US 2016/0025906 A1   Jan. 28, 2016

Related U.S. Application Data

(60) Provisional application No. 62/028,858, filed on Jul. 25, 2014.

(51) Int. Cl.
*G02B 5/02* (2006.01)
*B32B 37/12* (2006.01)
(Continued)

(52) U.S. Cl.
CPC .............. *G02B 5/0242* (2013.01); *B32B 5/16* (2013.01); *B32B 5/22* (2013.01); *B32B 5/30* (2013.01); *B32B 7/06* (2013.01); *B32B 7/12* (2013.01); *B32B 27/08* (2013.01); *B32B 27/10* (2013.01); *B32B 27/18* (2013.01); *B32B 27/304* (2013.01); *B32B 27/306* (2013.01);
(Continued)

(58) Field of Classification Search
CPC ...... G02B 5/128; G02B 6/0053; G02B 6/004; G02F 1/133606
USPC ........................................................... 40/544
See application file for complete search history.

(56) References Cited

U.S. PATENT DOCUMENTS 3,190,178 A * 6/1965 McKenzie ................ B44F 1/04
                                                    116/63 P
3,222,986 A * 12/1965 Altman ................... B41M 5/426
                                                    352/232
(Continued)

FOREIGN PATENT DOCUMENTS

IN    2439/MUM/2008    12/2008
IN    2421/CHE/2009    4/2011
(Continued)

OTHER PUBLICATIONS

International Search Report and Written Opinion issued in corresponding IA No. PCT/US2015/041674 dated Oct. 5, 2015.

*Primary Examiner* — Shin Kim
(74) *Attorney, Agent, or Firm* — Avery Dennison Corporation

(57) ABSTRACT

A two-in-one colored and translucent film structure suitable for use in backlit displays having a multi-point illumination source. The film structure utilizes a colored layer and a light-diffusing layer that reduces variations in the amount of light transmitted through different areas of a backlit sign. The light-diffusing layer includes light-diffusing particles dispersed in a transparent matrix material, and scatters light transmitted therethrough. The light-diffusing particles have an index of refraction that is different than an index of refraction of the matrix material.

75 Claims, 3 Drawing Sheets

(51) Int. Cl.

| | | |
|---|---|---|
| *F21V 5/00* | (2015.01) | |
| *F21V 9/08* | (2006.01) | |
| *F21V 13/02* | (2006.01) | |
| *G02B 1/04* | (2006.01) | |
| *G09F 13/00* | (2006.01) | |
| *G09F 13/22* | (2006.01) | |
| *B32B 5/16* | (2006.01) | |
| *B32B 5/22* | (2006.01) | |
| *B32B 5/30* | (2006.01) | |
| *B32B 7/06* | (2006.01) | |
| *B32B 7/12* | (2006.01) | |
| *B32B 27/08* | (2006.01) | |
| *B32B 27/10* | (2006.01) | |
| *B32B 27/18* | (2006.01) | |
| *B32B 27/30* | (2006.01) | |
| *B32B 27/32* | (2006.01) | |
| *B32B 27/36* | (2006.01) | |
| *G02B 5/20* | (2006.01) | |

(52) U.S. Cl.
CPC ........... *B32B 27/308* (2013.01); *B32B 27/32* (2013.01); *B32B 27/36* (2013.01); *B32B 37/12* (2013.01); *F21V 5/002* (2013.01); *F21V 9/08* (2013.01); *F21V 13/02* (2013.01); *G02B 1/04* (2013.01); *G02B 5/0278* (2013.01); *G09F 13/00* (2013.01); *G09F 13/22* (2013.01); *B32B 2250/02* (2013.01); *B32B 2255/10* (2013.01); *B32B 2255/26* (2013.01); *B32B 2260/00* (2013.01); *B32B 2260/025* (2013.01); *B32B 2260/046* (2013.01); *B32B 2264/0214* (2013.01); *B32B 2264/0257* (2013.01); *B32B 2264/102* (2013.01); *B32B 2264/104* (2013.01); *B32B 2264/12* (2013.01); *B32B 2307/402* (2013.01); *B32B 2307/4026* (2013.01); *B32B 2307/414* (2013.01); *B32B 2307/418* (2013.01); *B32B 2307/748* (2013.01); *B32B 2309/10* (2013.01); *B32B 2323/04* (2013.01); *B32B 2327/06* (2013.01); *B32B 2367/00* (2013.01); *B32B 2457/20* (2013.01); *B32B 2590/00* (2013.01); *G02B 5/206* (2013.01); *G09F 2013/222* (2013.01)

(56) References Cited

U.S. PATENT DOCUMENTS

| | | | |
|---|---|---|---|
| 3,493,286 A * | 2/1970 | Bacon, Jr. | G02B 5/128 |
| | | | 359/541 |
| 4,025,159 A * | 5/1977 | McGrath | G02B 5/128 |
| | | | 156/272.2 |
| 4,436,377 A | 3/1984 | Miller | |
| 4,721,877 A | 1/1988 | Kawakatsu et al. | |
| 5,066,098 A * | 11/1991 | Kult | G02B 5/128 |
| | | | 359/534 |
| 6,142,643 A * | 11/2000 | Araki | G02B 5/124 |
| | | | 313/498 |
| 6,157,486 A * | 12/2000 | Benson, Jr. | G02B 5/124 |
| | | | 359/487.05 |
| 6,282,821 B1 | 9/2001 | Freier et al. | |
| 6,470,610 B1 * | 10/2002 | Northey | G02B 5/124 |
| | | | 359/530 |
| 6,571,497 B1 * | 6/2003 | Aylward | B41M 3/003 |
| | | | 399/15 |
| 6,917,396 B2 | 7/2005 | Hiraishi et al. | |
| 6,985,295 B2 | 1/2006 | Ahn et al. | |
| 7,156,528 B2 * | 1/2007 | Weiss | G02B 5/124 |
| | | | 264/1.9 |
| 7,190,525 B2 | 3/2007 | Ito et al. | |
| 7,218,450 B2 | 5/2007 | Ahn et al. | |
| 7,320,823 B2 | 1/2008 | Kitahara et al. | |
| 7,359,118 B2 | 4/2008 | Kiso et al. | |
| 7,430,355 B2 * | 9/2008 | Heikenfeld | G02B 26/02 |
| | | | 362/600 |
| 7,710,644 B2 | 5/2010 | Kiso et al. | |
| 8,068,710 B2 * | 11/2011 | Bita | G02B 6/0035 |
| | | | 349/122 |
| 8,163,827 B2 | 4/2012 | Garcia-Leiner et al. | |
| 8,182,903 B2 | 5/2012 | Willham | |
| 8,268,106 B2 | 9/2012 | Willham | |
| 8,357,744 B2 | 1/2013 | Garcia-Leiner et al. | |
| 8,617,695 B2 | 12/2013 | Willham | |
| 8,619,363 B1 | 12/2013 | Coleman | |
| 8,662,687 B2 * | 3/2014 | Weber | G02B 5/305 |
| | | | 359/485.03 |
| 8,950,924 B2 * | 2/2015 | Wheatley | G02B 6/0051 |
| | | | 362/623 |
| 8,969,715 B2 * | 3/2015 | Debije | G02B 6/004 |
| | | | 136/247 |
| 9,028,123 B2 * | 5/2015 | Nichol | G02B 6/0076 |
| | | | 349/63 |
| 2003/0002158 A1 | 1/2003 | Masaki et al. | |
| 2003/0118807 A1 * | 6/2003 | Laney | G02B 5/0247 |
| | | | 428/315.5 |
| 2006/0029784 A1 | 2/2006 | Doan et al. | |
| 2006/0215958 A1 * | 9/2006 | Yeo | G02B 6/0041 |
| | | | 385/31 |
| 2007/0031097 A1 * | 2/2007 | Heikenfeld | G02B 26/02 |
| | | | 385/129 |
| 2007/0054133 A1 | 3/2007 | Sherman et al. | |
| 2008/0049419 A1 | 2/2008 | Ma et al. | |
| 2008/0112184 A1 | 5/2008 | Epstein et al. | |
| 2009/0160738 A1 | 6/2009 | Pellerite et al. | |
| 2009/0249669 A1 * | 10/2009 | Henkel | G09F 3/10 |
| | | | 40/675 |
| 2009/0300953 A1 * | 12/2009 | Frisch | B60R 13/10 |
| | | | 40/204 |
| 2010/0188751 A1 | 7/2010 | Clarke et al. | |
| 2011/0038140 A1 | 2/2011 | Ma et al. | |
| 2011/0043727 A1 | 2/2011 | Bosl et al. | |
| 2011/0103036 A1 * | 5/2011 | Bosl | G02B 5/3033 |
| | | | 362/19 |
| 2011/0134533 A1 | 6/2011 | Broman et al. | |
| 2011/0134623 A1 * | 6/2011 | Sherman | G02B 6/005 |
| | | | 362/19 |
| 2011/0165361 A1 | 7/2011 | Sherman et al. | |
| 2011/0228511 A1 * | 9/2011 | Weber | G02B 5/305 |
| | | | 362/19 |
| 2011/0260945 A1 | 10/2011 | Karasawa | |
| 2011/0298361 A1 | 12/2011 | Matsunaga et al. | |
| 2012/0021134 A1 | 1/2012 | Kolb et al. | |
| 2012/0027945 A1 | 2/2012 | Kolb et al. | |
| 2012/0118381 A1 * | 5/2012 | Debije | G02B 6/004 |
| | | | 136/259 |
| 2012/0201977 A1 | 8/2012 | Haag et al. | |
| 2013/0216738 A1 | 8/2013 | Owusu et al. | |
| 2013/0316146 A1 | 11/2013 | Willham | |
| 2015/0010723 A1 * | 1/2015 | Krishnan | B32B 7/02 |
| | | | 428/40.2 |
| 2015/0317923 A1 * | 11/2015 | Edmonds | G02B 5/208 |
| | | | 40/541 |
| 2016/0025906 A1 * | 1/2016 | Liu | G02B 1/04 |
| | | | 40/544 |

FOREIGN PATENT DOCUMENTS

| | | |
|---|---|---|
| WO | 2009/025103 | 2/2009 |
| WO | 2010/051229 | 5/2010 |
| WO | 2010/077521 | 7/2010 |
| WO | 2011/133629 | 10/2011 |
| WO | 2012/054229 | 4/2012 |
| WO | 2012/158414 | 11/2012 |

* cited by examiner

TWO-IN-ONE TRANSLUCENT AND COLORED FILM

CROSS-REFERENCE TO RELATED APPLICATION

The present application claims the benefit of U.S. Provisional Application No. 62/028,858 filed Jul. 25, 2014, which is incorporated herein by reference in its entirety.

FIELD

The present subject matter relates to backlit illuminated signs having an illumination source for transmitting light through a film structure bearing indicia or other communication. More particularly the present subject matter relates to light-diffusing, colored film structures mountable in relation to such illumination sources for facilitating an even distribution of light from the illumination sources.

BACKGROUND

Backlit illuminated signage generally includes a sign face, which typically comprises a transparent front member having a paper or polymeric film attached thereto. As used herein the term "transparent" means that a material or film does not absorb a significant amount of visible radiation and does not reflect a significant amount of visible radiation; rather, visible radiation is transmitted through the material. The paper or polymeric film structure can include a desired image, communication, indicia, or information thereon. In general, backlight or backlit applications are those in which the sign face is illuminated from a side (i.e. back) of the polymeric film structure that is opposite to the side (i.e. front) from which the sign face is intended to be viewed. The sign face may be illuminated also from the front or in some instances from the side or edge.

In backlight applications, the polymeric film structure is typically transparent, semitransparent, or translucent. Typically, the sign face, including the film structure, is held in front of a light source, which illuminates the sign face from behind. While such backlit signs or displays are generally acceptable, they do have certain limitations and/or drawbacks. For example, when the illumination source includes multiple point light sources, such as light emitting diode (LED) arrays, the light from the illumination source may unevenly illuminate the sign face.

SUMMARY

The difficulties and drawbacks associated with previously known means and strategies are addressed in the present film structures and related combinations and methods.

In one aspect, the present subject matter provides a translucent colored film structure comprising a colored layer, an adhesive layer, and light-diffusing particles. The colored layer includes pigment particles dispersed in a material. The adhesive layer includes an adhesive composition. At least one of the following is satisfied: a) light-diffusing particles are dispersed in a matrix that defines a light-diffusing layer that is free of an intentionally added adhesive component and that is separate and distinct from both the colored layer and the adhesive layer, the light-diffusing particles dispersed in the matrix of the light-diffusing layer having a refractive index that is different from the matrix; b) light-diffusing particles are dispersed in the colored layer, the light-diffusing particles dispersed in the colored layer having a refractive index that is lower than the material; c) light-diffusing particles are dispersed in the adhesive layer, the light-diffusing particles dispersed in the adhesive layer having a refractive index that is higher than the adhesive composition.

In another aspect, the present subject matter provides a sign face comprising a transparent or translucent substrate, and a film structure adhered to the substrate. The film structure includes a colored layer comprising pigment particles dispersed in a substantially transparent material, an adhesive layer including a substantially transparent adhesive composition, the adhesive layer bonding the film structure to the substrate, and light-diffusing particles. At least one of the following is satisfied: a) light-diffusing particles are included in a matrix that defines a light-diffusing layer that is free of an intentionally added adhesive component and is separate and distinct from both the colored layer and the adhesive layer, the light-diffusing particles dispersed in the matrix of the light-diffusing layer having a refractive index that is different from the matrix; b) light-diffusing particles are dispersed in the colored layer, the light-diffusing particles dispersed in the colored layer having a refractive index that is lower than the material; c) light-diffusing particles are dispersed in the adhesive layer, the light-diffusing particles dispersed in the adhesive layer having a refractive index that is higher than the adhesive composition.

In yet another aspect, the present subject matter provides a backlit sign comprising a frame, an illumination source, and a film structure. The frame includes a transparent or translucent member. The illumination source is disposed at a back side of the member and configured to transmit light through the member. The film structure includes a translucent colored layer, an adhesive layer bonding the film structure to the member, and light-diffusing particles. At least one of the following is satisfied: a) light-diffusing particles are included in a matrix that defines a light-diffusing layer that is free of an intentionally added adhesive component and is separate and distinct from both the colored layer and the adhesive layer, the light-diffusing particles dispersed in the matrix of the light-diffusing layer having a refractive index that is different from the matrix; b) light-diffusing particles are dispersed in the colored layer, the light-diffusing particles dispersed in the colored layer having a refractive index that is lower than the material; c) light-diffusing particles are dispersed in the adhesive layer, the light-diffusing particles dispersed in the adhesive layer having a refractive index that is higher than the adhesive composition.

In still another aspect, the present subject matter provides a method of making a colored and translucent film structure. The method includes providing a colored layer comprising pigment particles dispersed in a substantially transparent material. The colored layer defines a first face and an oppositely directed second face. The method includes disposing an adhesive layer comprising an adhesive composition on a side of the colored layer nearest the second face of the colored layer. The adhesive layer is configured to adhere the film structure to a substrate. The method includes incorporating light-diffusing particles into at least one of the following: a) a matrix to thereby define a light-diffusing layer that is free of an intentionally added adhesive component and is disposed on the second face of the colored layer between the colored layer and the adhesive layer, wherein the light-diffusing particles dispersed in the matrix of the light-diffusing layer have a refractive index that is different from the matrix, b) the colored layer, wherein the light-diffusing particles dispersed in the colored layer have a refractive index that is lower than the material, c) the adhesive layer, wherein the light-diffusing particles dispersed in the adhesive layer have a refractive index that is higher than the adhesive composition.

In yet another aspect, the present subject matter provides a method of displaying a visual communication. The method comprises providing an illumination source, a film structure, and a visual communication. The film structure comprises a colored layer including pigment particles dispersed in a material, an optional adhesive layer including an adhesive composition, and light-diffusing particles. At least one of the following is satisfied: a) light-diffusing particles are included in a matrix that defines a light-diffusing layer that is free of an intentionally added adhesive component and that is separate and distinct from both the colored layer and the optional adhesive layer, the light-diffusing particles dispersed in the matrix of the light-diffusing layer having a refractive index that is different from the matrix; b) light-diffusing particles are dispersed in the colored layer, the light-diffusing particles dispersed in the colored layer having a refractive index that is lower than the material; c) the film structure includes an adhesive layer and light-diffusing particles are dispersed in the adhesive layer, the light-diffusing particles dispersed in the adhesive layer having a refractive index that is higher than the adhesive composition. The method further includes positioning one of the film structure and the illumination source such that light from the illumination source will transmit through the film structure. The method also includes arranging the communication in line of light transmitted through the film structure to thereby display the communication.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

DETAILED DESCRIPTION OF THE EMBODIMENTS

Figure 1:
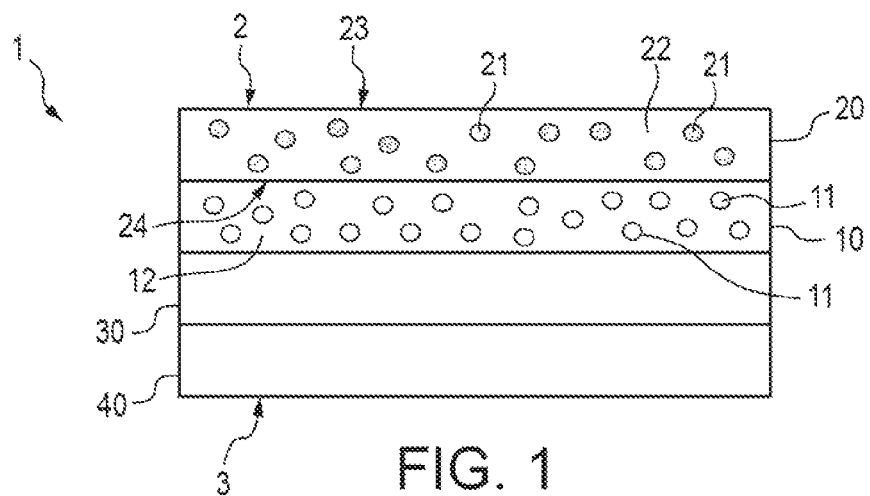
FIG. 1 is a schematic, cross-sectional view of a film structure in accordance with the present subject matter.

The subject matter described herein provides film structures suitable for use in backlit displays that are capable of sufficiently diffusing the light from an illumination source, such as an LED array, to thereby provide an evenly illuminated sign face.

Backlit illuminated signs have been used for general advertising, which may require complex images of high visual impact, and which may require that the content be changed from time to time. Such signs have become widely used in many public places both indoors and outdoors such as airports, rail and bus stations, hotel lobbies, theaters, pedestrian under-passes, etc.

A commonly used backlit display consists of a frame or box containing a light source at the back, and a front member which holds the image at the front of the box. The front member may be transparent and the image may be an indicia or communication on a translucent film. The translucent film is flexible in order to allow easier installation and removal from the front member. Using a flexible translucent film for an image media also allows for various processes to be used in order to impart an image or other indicia or communication onto the film.

Backlit displays illuminated by multiple point light sources, such as light emitting diodes (LED's), can typically employ 100 or more LED's, which may be positioned about ½ inch to 1 inch apart in rows, columns, and lines that are set behind the front member (i.e. front cover) of the sign box. Although this closely packed LED configuration may evenly illuminate the sign, it is expensive and complicated to construct because so many LED's are used. To reduce cost, the number of LED's may be reduced and the remaining LED's or other lights are spread somewhat farther apart but at a substantial reduction in brightness, which makes the sign less useful and gives the sign less marketing appeal because it appears dim compared, for example, with a neon sign of comparable size.

Further, when the multiple point light sources are spread out, the brightness of some signs varies from one part of the sign to another, producing bright regions (referred to herein as "hot spots") and dark regions on the sign face. When this happens, the areas of the backlit display directly in front of the multipoint light sources appear brighter than those further away, and the overall illuminated image has an objectionable unevenly illuminated appearance. This result is unsatisfactory as a non-uniformly illuminated sign may be undesirable.

Another option to reduce hotspots in LED backlit signs is to increase the concentration of pigment particles in the translucent film of the sign face. However, the degree of light transmission through the translucent film is important because if the translucent film material is too opaque, the image thereon will appear dull and the colors will lose their vibrancy.

Other attempts to produce uniformly illuminated backlit signs involve positioning the illumination source further from the front member of the sign box. Such positioning of the illumination source from the front member of the sign box may not reduce the hot spots and may further result in increasing the depth of the sign boxes, which may render them unsuitable for many applications where a thinner sign box is required.

To address these limitations, there is disclosed herein a film structure suitable for use in graphic display backlit signs. The present subject matter provides a two-in-one film structure that provides both pigment particles and light-diffusing particles in one film structure. That is, the film structure is made translucent by the light-diffusing particles in order to diffuse the transmitted light, while also being made colored by the pigment particles in order to provide a color to the transmitted light. Thereby, the two-in-one film structures provide both coloring and diffusion for the light transmitted through the film structure, without requiring the use of two separate films to achieve these two functions.

The present subject matter provides for the light-diffusing particles to be incorporated within the two-in-one film structure, such that the hue provided by the pigment particles and the adhesion provided by an adhesive component, are not undesirably affected by the incorporation of the light-diffusing particles.

The apparatuses and methods disclosed herein are described in detail by way of examples and with reference to the figures. Unless otherwise specified, like numbers in the figures indicate references to the same, similar, or corresponding elements throughout the figures. It will be appreciated that modifications to disclosed and described embodiments can be made and may be desired for a specific application. Identifications of specific details or examples are not intended to be, and should not be construed as, mandatory or limiting unless specifically designated as such.

Generally, and with reference to FIGS. 1-5, there is shown exemplary configurations for a film structure 1 in accordance with the present subject matter. In general, the film structures define a first side 2 and an oppositely directed second side 3 and include a light-diffusing layer 10, a colored layer 20, an adhesive layer 30, and an optional and removable release liner 40. Such film structures 1 are suitable for use in backlit displays and signs for reducing or eliminating hot spots. In several embodiments, the light-diffusing layer 10 is separate and distinct from both the colored layer 20 and the adhesive layer 30, and thereby does not undesirably affect the functioning of either of these layers 20, 30. As such, the light-diffusing layer 10 may not bear on the ability of the colored layer 20 in providing a certain hue to the display, or the adhesive layer 30 in providing strong adhesion with a substrate.

In particular, the film structure 1 may also include a desired image that may be printed, laminated or otherwise formed thereon. For example, the image may include, without limitation, text, graphics, photographic images and/or combinations of any of the foregoing. The image thereon may be multi-color, black and white or otherwise monotone.

Suitably, when mounted in, on, or to the backlit display 100 or sign, the film structure 1 is selectively illuminated by one or more light sources 70. Optionally, the display 100 or signage may be implemented as a backlit application, a front-lit application or a side or edge-lit application. The light source 70 optionally comprises an LED 71 or a collection of multiple LED's (i.e. LED array). The LED's 71 can be conventional LED's or organic LED's. Alternately, other electroluminescent material can be employed as the light source 70 or other conventional light sources may be employed, e.g., incandescent or fluorescent lighting. Optionally, a plurality of light sources are provided which each emit light at a different wavelength, or a single light source is provided which is capable of emitting light at a plurality of different wavelengths. In one exemplary embodiment, the intensity of the illumination is also able to be selectively controlled.

The film structures 1 provide a backlit display 100 which is virtually free or substantially free of hot spots or other objectionable variations in the amount of light emitted throughout the film structure 1, while at the same time the film structures 1 make it possible for the backlit sign 100 to have a shallow depth 54 between front 52 and back 53.

In one embodiment and as shown in FIG. 1, the light-diffusing layer 10 is disposed between the colored layer 20 and the adhesive layer 30. The colored layer 20 comprises pigment particles 21 dispersed in a material 22, such as for example a polymer. The colored layer 20 can comprise a thin translucent film. The colored layer 20 is shown to include a first face 23 and an oppositely directed second face 24. The first side 2 of the film structure 1 is defined by the first face 23. The light-diffusing layer 10 comprises light-diffusing particles 11 distributed in a matrix material 12. The light-diffusing layer 10 is disposed on the second face 24 of the colored layer 20. The adhesive layer 30 is located on a side of the light-diffusing layer 10 which is opposite from the colored layer 20. The film structure 1 in FIG. 1 includes the optional release liner 40 covering the adhesive layer 30.

Figure 2:
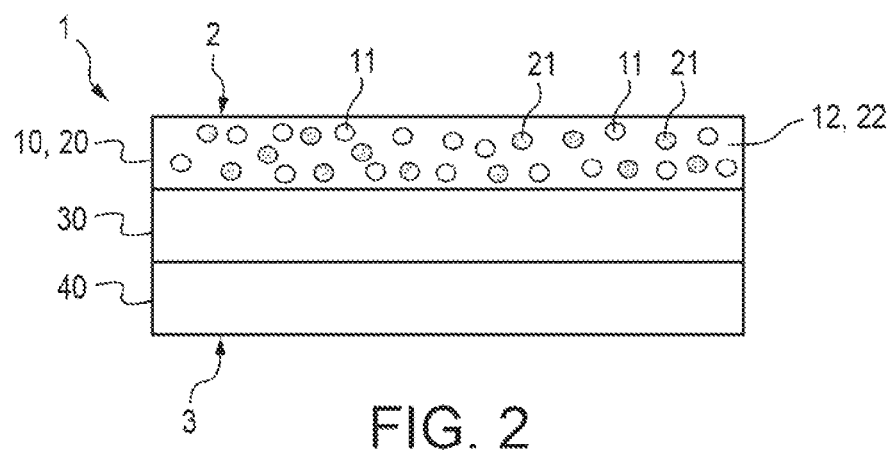
FIG. 2 is a schematic, cross-sectional view of another film structure in accordance with the present subject matter.

Another film structure 1 in accordance with the present subject matter is depicted in FIG. 2. In this embodiment, the film structure 1 comprises a combined colored and light-diffusing layer 10, 20, wherein both light-diffusing particles 11 and pigment particles 21 are substantially uniformly distributed throughout the combined light-diffusing and colored layer 10, 20. The first side 2 of the film structure 1 is defined by the combined light-diffusing and colored layer 10, 20. The film structure 1 includes an adhesive layer 30 set between the combined light-diffusing and colored layer 10, 20 and the release liner 40, which covers the adhesive layer 30 and defines the second side 3 of the film structure 1.

Figure 3:
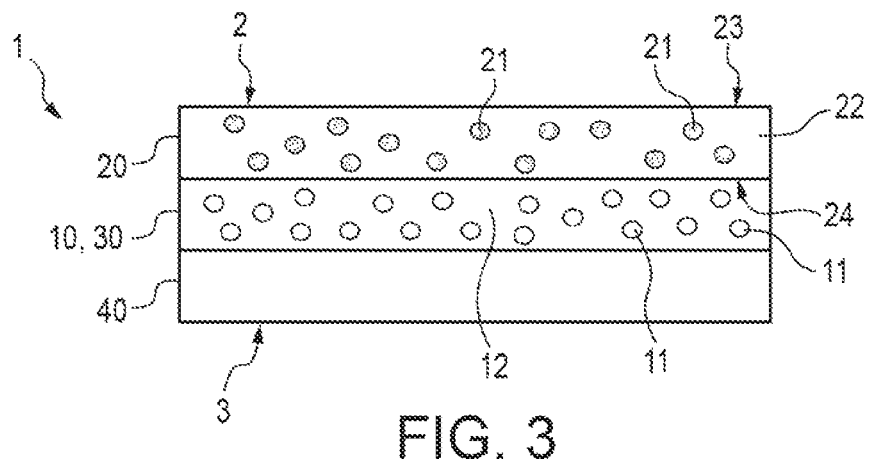
FIG. 3 is a schematic, cross-sectional view of yet another film structure in accordance with the present subject matter.

In another embodiment and as shown in FIG. 3, the film structure 1 is includes a colored layer 20 similar to that described and depicted in FIG. 1, and also includes a combined light-diffusing and adhesive layer 10, 30. The film structure 1 defines a first side 2 and an oppositely directed second side 3. The film structure 1 includes a colored layer 20 comprising pigment particles 21 dispersed in a material 22, such as for example a polymer material. The colored layer 20 comprises a first face 23 and an oppositely directed second face 24, wherein the first face 23 of the colored layer 20 defines the first side 2 of the film structure 1. In this embodiment the film structure 1 is shown to include a combined light-diffusing and adhesive layer 10, 30, wherein light-diffusing particles 11 are dispersed in a matrix 12 comprising an adhesive component.

In this embodiment shown in FIG. 3, and in the embodiment shown in FIG. 2, the light-diffusing layer 10 is not formed into a discrete light-diffusing layer 10 that is separate and apart from other layers 20, 30 of the film structure, but rather, is included in one of the colored layer 20 and the adhesive layer 30. In particular, the light-diffusing particles 11 are combined in various other layers 20, 30 such that the combined layers 10, 20 (FIG. 2) or 10, 30 (FIG. 3) perform more than only light-diffusing functions. In this way the combined light-diffusing and adhesive layer 10, 30 (FIG. 3) functions to disperse light and also functions to adhere the film structure 1 to a substrate. In FIG. 2, the combined light-diffusing and colored layer 10, 20 functions both to disperse light and to transmit colored light through the film structure 1. It will be understood that any combination or arrangement of layers of the films shown in FIGS. 1-3 could be included in a film structure 1 in accordance with the present subject matter, wherein light-diffusing particles 11 could be in one or more of the colored layer 20, the light-diffusing layer 10, and the adhesive layer 30.

FIGS. 1-3 depict a release liner 40, however it will be understood that a release liner 40 is not necessarily required to be included in accordance with the present subject matter, wherein the film structures 1 may not include a release liner 40. Further, the film structures 1 described herein can include additional and other layers disposed around and/or between the layers 10, 20, 30, 40 described in detail herein. It will also be understood that in accordance with the present subject matter, the first side 2 and the second side 3 of the film structure 1 can be defined by other and various additional layers than those 10, 20, 30, 40 depicted in the figures and which may be included in the film structure 1.

Further, the relative positioning of the various layers 10, 20, 30, 40 of the film structure 1 in relation to each other is not particularly limited by the present subject matter. Therefore, it will be understood that the various layers 10, 20, 30, 40 depicted in the several embodiments can be differently arranged in relation to each other, and such arrangements depicted in the figures are only for example. The colored layer 20, light-diffusing layer 10, adhesive layer 30, and the release liner 40 will now be described in greater detail below.

In one embodiment, the light-diffusing layer 10 is capable of being bent, shaped, folded, stretched, contoured, or otherwise manipulated by thermoforming procedures. In one aspect, the entire multi-layer film structure 1 (including the light-diffusing layer 10) is capable of being bent, shaped, folded, stretched, contoured, or otherwise manipulated by thermoforming procedures. It will be appreciated that in this embodiment, the light-diffusing layer 10 individually, or the multi-layer film structure 1 including the light-diffusing layer 10 may be laminated on a plastic sheet, for example a sheet comprising poly(methyl methacrylate), polycarbonate, or polyethylene terephthalate, and co-thermoformed along with the plastic sheet to produce a contoured structure or three dimensional structure that can be used on flat or flexible surfaces in backlight illumination applications.

Colored Layer

In accordance with the present subject matter, the colored layer 20 is a layer defined to comprise pigment particles 21 dispersed in a material 22. The material 22 comprising pigment particles dispersed therein, can be formed into a thin film for example, in order to form the colored layer 20, wherein the material 22 is used as a continuous phase and the pigment particles 21 are used as the discontinuous phase of the colored layer 20. The colored layer 20 is a layer that exhibits a light transmission of less than 100% (e.g. transmission levels of at least about 20-90%), or make up a series of light transmittance values less than 100%, and which absorbs a range of light wavelengths so that the spectrum of light from the light source 70 is altered as it passes through the colored layer 20. For example, if the light source 70 emits a typical "white light" spectrum, then after that light passes through the colored layer 20, the spectrum of the transmitted light may be within one or more of the wavelength ranges associated with colors. In other words, the color of the light that passes through the colored layer 20 will change from the original color (e.g. white) to a resulting color (e.g. yellow), which may then be seen by an observer as the resulting color.

The pigment particles 21 can comprise any organic or inorganic pigment that can impart a color to the film structure 1 and to the light transmitted therethrough. The pigment can be an organic pigment or an inorganic pigment, including for example a metallic pigment, a metallic flake, a metal oxide pigment, a heavy metal-based pigment, or a heavy metal-free pigment.

In one aspect, the pigment particles 21 are those suitable for imparting an intended color for a backlit display 100. The pigment particles 21 used in the colored layer 20 can comprise one or more populations of different types of pigments including pigments of different color and different types of pigment, such as fluorescent, phosphorescent, and luminescent pigments for example. The pigment particles 21 can be randomly dispersed in the colored layer 20, or can be confined or selectively distributed in certain regions or areas of the colored layer 20. Additionally, the film structure 1 can include more than one colored layer 20 in accordance with the present subject matter, so as to impart various displayed colors when light is transmitted through the film structure 1. If more than one colored layer 20 is used, the plurality of colored layers can be disposed over one another to form a multi-layer colored structure, or can be arranged next to one another to form a single-layer colored film.

In the various embodiments and in accordance with the present subject matter, the pigment particles 21 may also act to scatter transmitted light in a backlit display 100, such that the colored layer 20 appears translucent rather than transparent. This feature may combine with the scattering effect of the light-diffusing layer 10 in order to reduce or eliminate hot spots in a backlit display 100. However, it will be understood that the present subject matter also includes colored layers 20 that are transparent (i.e. do not substantially scatter light) and are colored, wherein the scattering of light is substantially produced by the light-diffusing layer. In one embodiment, the colored layer includes light-diffusing particles 11. The light-diffusing particles will be described in more detail below. In one aspect, the light-diffusing particles included in the colored layer have an index of refraction that is less than the index of refraction of the material 22.

The weight percent (wt %) of the pigment particles 21 used in the colored layer 20 relative to the total weight of the colored layer 20 is not particularly limited, and can range anywhere from about 2 wt % to about 90 wt %. In one embodiment, the pigment particles 21 comprise from about 5 wt % to about 25 wt % of the colored layer 20, and in another embodiment from about 7 wt % to about 15 wt % of the colored layer 20.

The size of the pigment particles 21 is also not particularly limited by the present subject matter. In this regard the pigment particles 21 can have a median largest dimension from about 0.01 microns (μm) to about 10 μm, and in another aspect from about 0.1 μm to about 3 μm. At a median largest dimension between 0.1 μm and 3 μm, the pigment particles 21 offer sufficient wavelength selective absorption to impart a color to the transmitted light, while also sufficiently scattering the transmitted light such that the colored layer 20 is translucent and hot spots are eliminated or reduced in a backlit display 100. It will be understood that the present subject matter includes other amounts and other sizes for the pigment particles 21 included in the colored layer 20 which can be modulated for a particular application.

The material 22 used as the continuous phase of the colored layer 20 is not particularly limited by the present subject matter and in one aspect comprises a polymer in which the pigment particles 21 can be dispersed and which can be formed into a thin film or sheet. In one aspect, the material 22 is a polymer that will form a substantially transparent film material. Despite the fact that the material is substantially transparent, when combined with the pigment particles 21 it may nevertheless form a colored layer 20 that is translucent. In other aspects the material 22 alone (i.e., without pigment particles 21) can be a translucent material.

Examples of polymers useful as the continuous phase material 22 in the colored layer 20 include polyvinyl chloride (PVC), polyvinyl fluoride, polyvinylidene difluoride, polyethylene terephthalate (PET), polypropylene (PP), high density polyethylene (HDPE), low density polyethylene (LDPE), linear low density polyethylene (LLDPE), metallocene polyethylene (mPE), polystyrene, polylactic acid (PLA), nylon, ethylene acrylic acid (EAA), ethylene vinyl acetate (EVA), ethylene methacrylates (EMA), cellulose ester (for example, cellulose triacetate, cellulose acetate propionate, cellulose acetate butyrate, cellulose tripropionate, and cellulose diacetate), polyolefin (for example, polyethylene, polypropylene, norbornene polymer), polyester (for example, polymethacrylic ester, polyacrylic ester), polycarbonate, cyclo-olefin polymer, polyalylate, polysulfone, vinyl polymer (for example, polyvinyl alcohol), polyamide, polyimide, cyclo-olefin copolymer, acrylic polymers, styrene acrylic polymers, polyurethane (PU), polyurethane-acrylic copolymer, polyurethane-acrylic blend, urethane-acrylic hybrid polymer, and combinations thereof.

Also, the colored layer 20 can include a transparent material 22 that is inherently printable or can be rendered printable (by commercial printing processes) through the use of, for example, corona, flame, or plasma treatment whereby the surface energy and composition of the first side 2 of the film structure 1 is modified during the treatment step. An example of an inherently printable transparent material can include, for instance, a PVC film. An example of a transparent material that can be rendered printable through a corona, flame, or plasma treatment can include, for instance, biaxially oriented polypropylene ("BOPP"). Other such transparent materials, either inherently printable or rendered printable through treatment, can be used in accordance with the present subject matter.

The colored layer 20 may also be unoriented, uniaxially oriented, or biaxially oriented film, produced by drawing the film in various directions in the plane of the film to achieve a satisfactory combination of mechanical and physical properties.

The thickness of the colored layer 20 is also not particularly limited and may depend on the wt % of pigment particles 21 used in the colored layer 20. In one embodiment, the thickness of the colored layer 20 can range from about 10 μm to about 200 μm, and in another aspect from about 30 μm and 60 μm. In one embodiment as depicted, for example, in FIGS. 4-5, the colored layer 20 can also include various printed indicia, communication, or images 83 applied to the first face 23 of the colored layer 20.

In one embodiment, the continuous phase material 22 of the colored layer 20 comprises polyvinyl chloride (PVC). PVC is suitable for the continuous phase material 22 for the colored layer 20 due to its optical transparency and its durability when exposed to environmental conditions such as sun, rain, heat, and cold. In one aspect the colored layer 20 comprises a PVC-based film with a thickness ranging from about 30 μm to about 60 μm, wherein inorganic pigment particles 21 having a median largest dimension between 0.1 μm and 3 μm, are randomly dispersed therein.

Light-Diffusing Layer

As previously discussed, the film structure 1 of the present subject matter comprises a light-diffusing layer 10 that is either combined with one of the colored layer 20 and the adhesive layer 30, or is separate and distinct from these two layers 20, 30. In the various embodiments described herein, light-diffusing particles 11 can be dispersed in a light-diffusing layer 10 that is separate and distinct from both the colored layer 20 and the adhesive layer 30, in one or more of the colored layer 20 and the adhesive layer 30, or in a combination of layers including being dispersed in a separate and distinct light-diffusing layer 10 and also in one or both of the colored layer 20 and the adhesive layer 30. In several embodiments where the light-diffusing layer 10 is separate and distinct from both the colored layer 20 and the adhesive layer 30, the light-diffusing layer 10 may be free of an intentionally added adhesive component.

In accordance with the present subject matter, the light-diffusing layer 10 is defined as comprising light-diffusing particles 11 dispersed in a matrix material 12, wherein the light-diffusing particles 11 have a refractive index that is different from the refractive index of the matrix 12. The material 12 having the light-diffusing particles 11 dispersed therein, can be formed into a thin film or layer in order to form the light-diffusing layer 10. While not be bound to any particular theory, it is believed that light is diffused (i.e. scattered) when transmitted through the light-diffusing layer 10 due to diffuse reflection of light by the light-diffusing particles 11 at the interface between the light-diffusing particles 11 and the matrix 12; and/or diffuse transmittance of light through the light-diffusing particles 11. It is believed that one or both of diffuse reflection and diffuse transmittance are due to the light-diffusing particles 11 having a different refractive index than the matrix material 12 into which they are dispersed. It is also believed that the amount or degree of light scattering is directly related to the total area of the interface between the light-diffusing particles 11 and the matrix 12.

Because the light-diffusing particles 11 have a different refractive index than the matrix 12, it is in this way that the light-diffusing particles 11 are able to provide sufficient scattering of light that is transmitted through the film structure 1 in order to give the light-diffusing layer 10 a translucent (hazy or misty) appearance through which light can be transmitted, and so that hot spots are reduced or eliminated in backlit displays 100. The light-diffusing layer is a translucent layer that has a percent haze value (i.e. diffuse transmittance/total transmittance •100) of at least 50%, and which offers total light transmission of at least about 50%.

When the light-diffusing particles 11 are contained in a light-diffusing layer 10 that is separate and distinct from both the colored layer 20 and the adhesive layer 30, the light-diffusing particles 11 can have a refractive index that is either higher or lower than the matrix 12 into which they are dispersed. In contrast, light-diffusing particles 11 that are dispersed in the adhesive layer 30 (FIG. 3) to form a combined light-diffusing and adhesive layer 10, 30 may have a higher index of refraction than the adhesive composition into which they are dispersed. Additionally, light-diffusing particles 11 that are dispersed in the colored layer 20 (FIG. 2) to form a combined light-diffusing and colored layer 10, 20 may have a lower index of refraction than the material 22 into which they are dispersed.

Light-diffusing particles 11 that are dispersed in the adhesive layer 30 have a refractive index that can range anywhere from about 1.6 to about 2.8, or more, such that the light-diffusing particles 11 have a higher index of refraction that the adhesive composition into which they are dispersed. Light-diffusing particles 11 that are dispersed in the colored layer 20 have a refractive index that can range anywhere from about 1.0 to about 1.5, or less, such that the light-diffusing particles 11 have a lower index of refraction that the material 22 into which they are dispersed. In another aspect, where the light-diffusing particles 11 are dispersed in a matrix free of an adhesive component to form a light-diffusing layer 10 that is separate and distinct from both the colored layer 20 and the adhesive layer 30, the refractive index of the light-diffusing particles 11 can range anywhere from about 1.0 to about 1.5, in some cases from about 1.3 to about 1.5, and in other cases from about 1.4 to about 1.45 on a low end; and from about 1.6 to about 2.8 on a high end. Within these ranges, the light-diffusing particles 11 can have a different (e.g. lower or higher) index of refraction than the matrix 12 into which they are dispersed. As used herein, the refractive index of a substance will be understood to be measured at the yellow doublet sodium D-line, with a wavelength of 589 nanometers as is conventional.

In one embodiment, the light-diffusing particles 11 are white or black, or substantially white or substantially black. In another embodiment, the light-diffusing particles 11 are transparent, or substantially so. In another embodiment, the light-diffusing particles 11 may comprise one or more of white particles or particles that are substantially white, black particles or particles that are substantially black, and transparent particles or particles that are substantially transparent. When white, black, or transparent light-diffusing particles 11 are used, the color transmitted through the colored layer 20 may remain substantially unchanged. In this way, the effectiveness of the pigment particles 21 used in the colored layer 20 to provide a color for the film structure 1 is not diminished and the hue is not substantially changed by the inclusion of the light-diffusing particles 11. White or transparent light-diffusing particles 11 can be used so as to not shade (i.e. darken) the color provided by the colored layer 20 as may happen by using black light-diffusing particles 11. In one aspect, the light-diffusing particles 11 are white, or substantially so.

The composition of the light-diffusing particles 11 is not particularly limited by the present subject matter, and for high refractive index applications (e.g. index of refraction values of 1.6 to 2.8), the light-diffusing particles 11 can comprise titanium oxide ($TiO_2$), silicon dioxide ($SiO_2$), calcium carbonate ($CaCO_3$), barium sulfate ($BaSO_4$), and the like. These higher refractive index particles provide good light-diffusing properties and are able to diminish or eliminate hotspots on backlit displays 100.

In embodiments where the light-diffusing particles 11 have a smaller index of refraction (e.g. index of refraction values of 1.0 to 1.5) than the matrix 12 into which they are dispersed, the light-diffusing particles 11 can include a material comprising an organic or inorganic compound such as for example, silicone resin, polytetrafluoroethylene (PTFE), roughened quartz, flashed opal, or the like; or hollow structures or hollow particles such as hollow glass beads or hollow resin beads, or hollow structures made from other materials. Such low index of refraction particles possess good light-diffusing properties when they are incorporated into a matrix with a higher refractive index. Concurrently, these low index of refraction light-diffusing particles 11 also provide a lower extinction coefficient compared to higher refractive index particles such as $TiO_2$ particles, $SiO_2$ particles, $CaCO_3$ particles, and $BaSO_4$ particles for example. This means that less light is absorbed by these low index of refraction light-diffusing particles 11 compared to $TiO_2$ particles, $SiO_2$ particles, and $BaSO_4$ particles, for example. Conversely, more light is transmitted through the layer containing these low index of refraction light-diffusing particles 11 compared to $TiO_2$ particles, $SiO_2$ particles, and $BaSO_4$ particles, for example. Accordingly, such low index of refraction light-diffusing particles 11 provide high light transmission levels for the film structure into which they are incorporated, while also providing the necessary diffusion for light that is transmitted therethrough in order to prevent or reduce the appearance of hotspots on a backlit display 100. Film structures 1 utilizing a light-diffusing layer 10 having such low index of refraction light-diffusing particles 11, can thereby provide a more brightly and evenly illuminated backlit display.

Examples of silicone resin suitable for the present subject matter include KMP-590, available from Shin-Etsu Chemical Co., Ltd., 6-1, Ohtemachi 2-chome, Chiyoda-ku, Tokyo 100-0004, Japan, or Tospearl 120, available from Momentive, and 9701 and EP-9801 from Dow Corning. Examples of PTFE particles suitable for the present subject matter include Zonyl®, available from Dupont de Nemours, 1007 N Market St, Wilmington, Del. 19898. Examples of hollow structures suitable for the present subject matter include Expancel beads from AkzoNobel Pulp and Performance Chemicals Inc., 240 Northmont Parkway, Duluth, Ga. 30096; and Ropaque beads available from Dow Chemical Company, 2030 Dow Center, Midland, Mich. 48674. Ropaque beads are styrene/acrylic copolymer beads having a particle size of 0.61 μm. Beads such as Expancel and Roqaque beads have a hollow interior that is filled with air, which can provide a low refractive index and low light extinction coefficient. In accordance with the present subject matter, other compositions can be used for the light-diffusing particles 11 as appropriate for particular application as desired.

The weight percent of the light-diffusing particles 11 used in the light-diffusing layer 10 or other layers 20, 30 relative to the total weight of the light-diffusing layer 10 or other layers 20, 30 is not particularly limited, and can be provided in any amount that sufficiently diminishes hot spots in a backlit display 100 as desired. However, the amount of light-diffusing particles 11 will affect the area of the interface between the light-diffusing particles 11 and the matrix 12, and will thereby affect the amount of light scattering attributed to the light-diffusing layer 10 or combined layers 10, 20 and 10, 30. Generally, as the amount of the light-diffusing particles 11 decreases, the area of the interface will decrease between the light-diffusing particles 11 and the matrix 12, which may result in less scattering of light. Conversely, as the amount of light-diffusing particles 11 increases, the area of the interface will increase between the light-diffusing particles 11 and the matrix 12, which may result in more scattering of light.

Further, the amount of light-diffusing particles 11 used in the light-diffusing layer 10 or other layers 20, 30 may be related to the thickness of the light-diffusing layer 10 or other layers 20, 30 containing the light-diffusing particles 11, wherein a higher amount of light-diffusing particles 11 may be desired when a thinner light-diffusing layer 10 is used, and lesser amount of light-diffusing particles 11 may be desired when a thicker light-diffusing layer 10 is used. In this respect, the light-diffusing particles 11 can be included anywhere from about 2 wt % to about 90 wt % of the total weight of the light-diffusing layer 10 or other layer 20, 30. In one embodiment, the light-diffusing particles 11 comprise from about 5 wt % to about 25 wt % of the light-diffusing layer 10, and in another embodiment from about 10 wt % to about 20 wt % of the light-diffusing layer 10.

The size of the light-diffusing particles 11 is not particularly limited by the present subject matter. However, the size of the light-diffusing particles 11 will affect the area of the interface between the light-diffusing particles 11 and the matrix 12, and will thereby affect the amount of light scattering attributed to the light-diffusing layer 10. Generally, as the size of the light-diffusing particles 11 decreases down to a certain size, the area of the interface will increase between the light-diffusing particles 11 and the matrix 12, which may result in more scattering of light. Conversely, as the size of the light-diffusing particles 11 increases, the area of the interface will decrease between the light-diffusing particles 11 and the matrix 12, which may result in less scattering of light.

In this regard, the light-diffusing particles 11 can have a median largest dimension that sufficiently scatters light as desired. In one embodiment, median largest dimension of the light-diffusing particles 11 ranges from about 0.01 μm to about 10 μm. In another embodiment the light-diffusing particles 11 have a median largest dimension from about 0.1 μm to about 3 μm. At a particle size of from about from about 0.01 μm to about 10 μm, or from about 0.1 μm to about 3 μm, the light-diffusing particles 11 provide sufficient scattering of the transmitted light such that the light-diffusing layer 10 can minimize or eliminate hot spots on a backlit display 100.

It will be understood that the present subject matter includes other amounts and other sizes for the light-diffusing particles 11 included in the light-diffusing layer 10, which can be modulated for a particular application.

In one aspect, the light-diffusing particles are those suitable for preventing or reducing hot spots for a backlit display 100. The light-diffusing particles 11 used in the light-diffusing layer 10 can comprise one or more populations of different types of light-diffusing particles 11 including two or more particle populations with different refractive indices and comprising different types of material. For example, a first population can have a refractive index of from about 1.0 to about 1.5 and a second population can have a refractive index of from about 1.6 to about 2.8. The light-diffusing particles 11 can be randomly dispersed in the light-diffusing layer 10, or can be confined or selectively distributed in certain regions or areas of the light-diffusing layer 10. Additionally, the film structure 1 can include more than one light-diffusing layer 10 in accordance with the present subject matter, so as to impart various diffractive effects when light is transmitted through the film structure 1. If more than one light-diffusing layer 10 is used, the plurality of light-diffusing layers can be disposed over one another to form a multi-layer light-diffusing structure, or can be arranged next to one another to form a single-layer light-diffusing film.

The matrix material 12 of the light-diffusing layer 10 is not particularly limited by the present subject matter, and in one embodiment includes a transparent polymeric material capable of having light-diffusing particles 11 dispersed therein and is capable of being formed into a thin layer or film. The matrix material 12 can comprise any material that is capable of sufficiently transmitting light and containing the light-diffusing particles 11. The matrix material 12 can be transparent to translucent, and can include a polymer material for example. In this respect, the matrix material 12 can comprise any polymer material listed as being suitable for the continuous phase material of the colored layer 20. In one embodiment, the matrix 12 of the light-diffusing layer 10 that is separate and distinct from the adhesive layer 30 and the colored layer 20, is free of an intentionally added adhesive component.

In one aspect the matrix material 12 comprises a PVC polymer having the light-diffusing particles 11 dispersed therein. In this aspect, the light-diffusing layer 10 may be capable of being shaped or otherwise contoured using thermoforming techniques. Other transparent or translucent materials can be used including other polymers or substances. When the light-diffusing particles 11 are combined into the light-diffusing and colored layer 10, 20 (FIG. 2), the matrix 12 can be the material 22 into which the pigment particles 21 are dispersed. When the light-diffusing particles 11 are included in the adhesive layer 30, the matrix material 12 can include an adhesive component, for example a pressure sensitive acrylic-based adhesive.

In one embodiment, the light-diffusing particles 11 do not substantially affect the hue (i.e. color), tint (amount of white added to a color hue), tone (amount of gray added to a color hue), or shade (amount of black added to a color hue) of the colored layer 20 provided by the pigment particles 21, and do not substantially affect the tackiness of the adhesive layer 30. This may be accomplished in one aspect, by including the light-diffusing particles 11 in a light-diffusing layer 10 that is separate and distinct from the colored layer 20 and the adhesive layer 30.

As will be understood, the loading of light-diffusing particles 11 and a thickness of the light-diffusing layer 10 may depend on variables associated with the illumination source 70 (such as the type, number, and intensity of lights used as the illumination source, for example), the distance between the illumination source 70 and the film structure 1, the level of translucency of the colored layer 20, and other variables. As such, the loading of light-diffusing particles 11 and a thickness of the light-diffusing layer 10 can be varied for a particular application as desired.

Adhesive Layer

Figure 4:
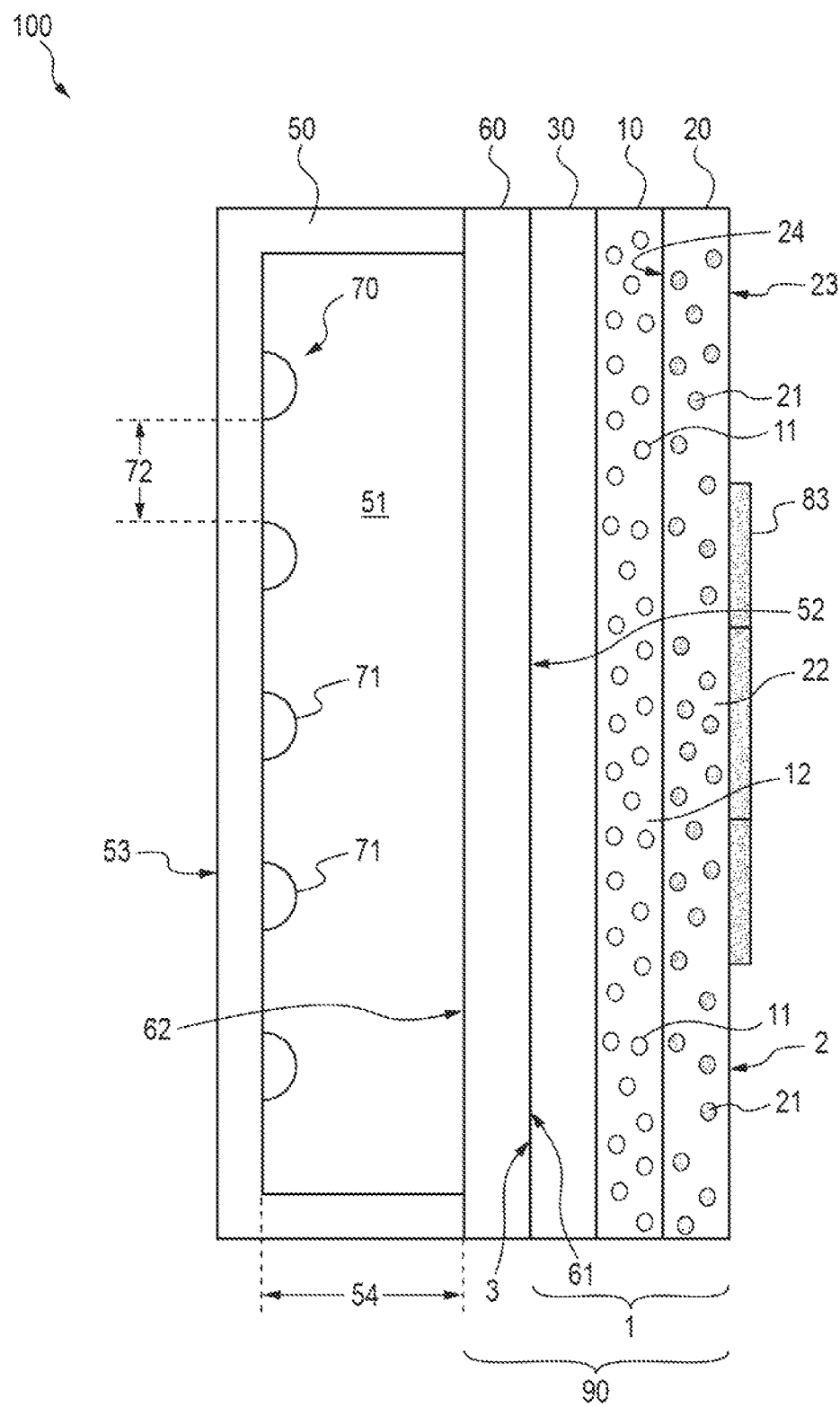
FIG. 4 is a schematic, cross-sectional view of a backlit sign in accordance with the present subject matter.

The adhesive layer 30 of the present subject matter is used to bond the film structure 1 to a substrate, for example to a front side 61 of a front member 60 of a backlit display 100 as shown in FIG. 4. In one embodiment, the adhesive layer 30 also comprises the light-diffusing particles 11 and thereby also acts as a combined light-diffusing and adhesive layer 10, 30 to both diffuse light and adhere the film structure 1 to a substrate.

The adhesive component used to form the adhesive layer 30 of the film structure 1 is not particularly limited by the present subject matter, and can include any adhesive useful for a particular application. The adhesive layer 30 may be translucent to transparent, or substantially so, in order to maintain the amount of light transmitted through the film structure 1. In one embodiment, the adhesive layer includes light-diffusing particles 11. The light-diffusing particles have been described in more detail herein. In one aspect, the light-diffusing particles included in the adhesive layer have an index of refraction that is more than the index of refraction of the adhesive composition of the adhesive layer.

The adhesive composition used in the adhesive layer 30 is not particularly limited by the present subject matter, and can include any number or combinations of drying adhesives, contact adhesives, hot-melt adhesives, reactive adhesives, natural or synthetic adhesives, or pressure sensitive adhesives (PSA's).

In this regard, the adhesive component or material in the adhesive layer 30 can comprise for example, a pressure sensitive adhesive (PSA) that is either permanent or removable. In one embodiment, the adhesive layer 30 comprises a PSA that is capable of allowing the film structure 1 to be selectively applied and removed from a substrate. That is, the film structure 1 can be applied to a substrate and adhered thereto, yet can be removed at a later time so that the film structure 1 can be repositioned or so that another different film structure can be applied to the same substrate for advertising or other purposes.

The PSA can comprise any combination of solvent adhesives, ultraviolet adhesives, 100% solids adhesives, hot melt adhesives, and emulsion adhesives including emulsion acrylic adhesives, or olefin block copolymer adhesives. Suitable PSA's can be composed of elastomeric polymers with or without tackifiers. A variety of polymers can be used to manufacture suitable pressure sensitive adhesives; for example, acrylic and methacrylic ester homo- or copolymers, butyl rubber based systems, silicones, nitriles, styrene block copolymers, ethylene-vinyl acetate, urethanes, vinyl esters and amides, olefin copolymer materials, natural or synthetic rubbers, etc. and combinations thereof. Other pressure sensitive adhesives can be used; such as those comprising polyurethane polymers, for example.

The polymer compositions generally constitute from about 30% to about 80% by weight of a polymer with the balance being made up of water or other solvent, and minor amounts of volatile organic compounds and unreacted monomer surfactants, tackifiers, etc. Said water or solvent may be present in an amount of from about 20% to about 70% by weight of the adhesive composition.

Aqueous mixtures of a pressure sensitive adhesive may comprise an acrylic based polymer matrix comprising particles of the acrylic polymer dispersed in an aqueous medium, or a rubber based polymer matrix adhesive.

Aqueous acrylic based polymers in accordance with the present subject matter may comprise homopolymers and copolymers of various acrylic monomers including alkyl acrylates such as ethyl acrylate, butyl acrylate, propyl acrylate, 2-ethylhexyl acrylate, isooctyl acrylate, isodecyl acrylate, etc.; alkyl methacrylates such as methyl methacrylate, ethyl methacrylate, butyl methacrylate, etc. These acrylate monomers may be copolymerized with vinyl-unsaturated monomers such as vinyl acetate, vinyl propionate; styrenic monomers such as styrene, methyl styrene, etc.; unsaturated carboxylic acids such as acrylic acid, methacrylic acid, itaconic acid, maleic acid, fumaric acid, etc.; acrylamide, vinyl caprolactam, etc. The rubber based pressure sensitive adhesive polymer matrices useful in the present subject matter are normally pressure sensitive adhesive matrices based on styrene and butadiene random polymers and mixtures thereof. In one aspect, the adhesive layer 30 comprises a transparent acrylic-based PSA.

The copolymers for the adhesive of the instant subject matter can be stabilized against UV and oxidative degradation by using UV stabilizers and antioxidants. Fillers, colorants, tackifiers, plasticizers, oils, and the like, may also be added in accordance with the present subject matter.

The adhesive layer 30 can be patterned, continuous, or applied as discrete islands of adhesive. The adhesive layer 30 can have relative uniform thickness or can vary. In one embodiment, the adhesive layer 30 comprises a continuous layer with relative uniform thickness.

Although the adhesive layer 30 is depicted in FIG. 4 as being disposed on a side of the colored layer 20 or the light-diffusing layer 10 closer to the second side 3 of the film structure, it will be understood that the adhesive layer 30 can be disposed on a side of the colored layer 20 or the light-diffusing layer 10 closer to the first side 2 of the film structure 1. This may be useful for example, wherein the film structure 1 is applied to the back side 62 of a front member 60 of a backlit display 100.

Release Liner

In one embodiment, the film structure 1 has a release liner 40 covering the adhesive layer 30. When present, the release liner 40 is removed from the adhesive layer 30 to expose the adhesive layer 30 prior to applying the film structure 1 to a substrate, for example to a front member 60 of a backlit sign 100. The release liner 40 provides protection for the adhesive layer 30 and prevents premature exposure of the adhesive layer 30 to the surrounding environment. A release liner 40 protects against contamination by dirt, liquids, or other elemental exposure. Inadvertent contact or exposure to environmental conditions can decrease the tackiness of the adhesive layer 30, and prevent the desired adhesion. The release liner 40 thereby maintains adhesive tackiness of the adhesive layer 30 and prevents premature bonding with a substrate before an intended time.

The release liner 40 also allows for more aggressive handling of the film structure 1 prior to application to a substrate. For example, the release liner 40 provides more protection for the adhesive layer 30 during lamination, printing, converting, packaging, handling, or shipping. Handling of the film structure 1 can include operations such as passing the film structure 1 through converting equipment including rollers, die cutting stations, packaging stations, printing stations, and other manufacturing processes. The release liner 40 provides stiffness to the film structure 1 to facilitate these steps. The release liner 40 may cover all or a portion of the adhesive layer 30.

Typical liner materials are super calendered kraft paper, glassine, clay coated kraft paper, machine finished kraft paper, machine glazed paper, biaxially oriented polyethylene terephthalate film, polypropylene film, polyethylene film, biaxially oriented polypropylene film, polyester, acrylic, nylon, cellulosic derivative, butylene; isobutylene; high, medium, low, and linear low density polyethylene; ethylene vinyl acetate; ethylene acrylic acid; ethylene methyl (meth) acrylate; ethylene butyl acrylate; polypropylene; ethylene/propylene copolymers; and impact resistant ethylene/propylene copolymers and combinations thereof. The materials used for the release liner 40 can include a non-stick coating such as silicone or polytetrafluoroethylene, or the like in order to increase the release properties of the liner from the adhesive layer 30. In one embodiment, the release liner 40 comprises a siliconized polyester liner.

The release liner 40 can have a thickness from about 5 μm to about 20 μm or more, and in one embodiment has a thickness of about 10 μm.

Optional Layers and Treatments

The film structures 1 of the present subject matter can include other layers or treatments for a desired purpose or use, including printing receptive layers or treatments, hydrophobic layers or treatments, additional film layers, or the like.

The various layers of the film structure 1 can include one or more stabilizers to impart resistance to thermal degradation. Inorganic fillers, either fibrous or non-fibrous, may be used where desirable. In addition, other additives, such as solvents, diluents, binders and the like may be employed in forming the various layers. The layers may also include other materials such as antioxidants, light stabilizers such as (UV) light absorbers and/or other light stabilizers, viscosity modifiers, antiblock and/or slip additives, reinforcing agents, processing acids, mineral oil, and the like.

Sign Face and Backlit Display

In accordance with the present subject matter, the various film structures 1 disclosed herein can be included as part of a backlit display 100 or sign face 90, or as part of other types of displays that may or may not be backlit.

Figure 5:
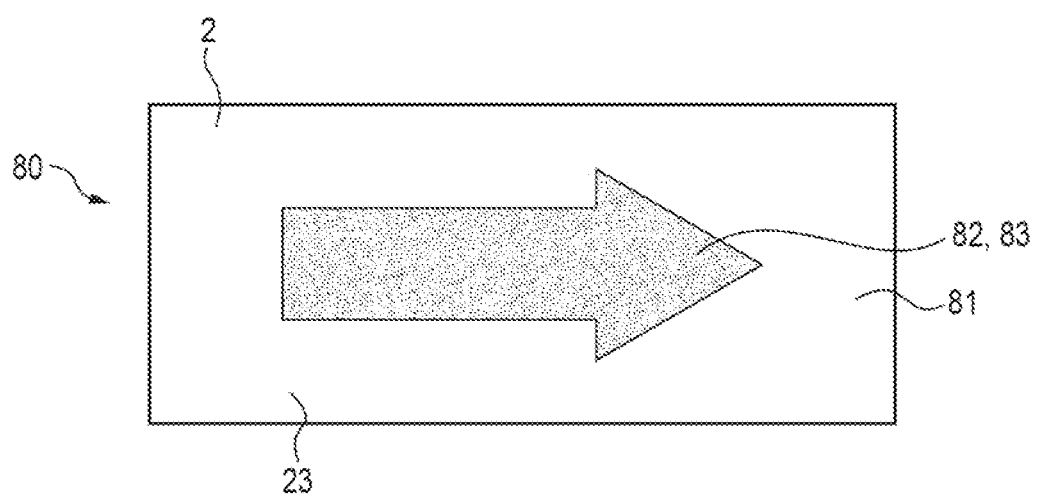
FIG. 5 is a schematic, front view of a backlit sign in accordance with the present subject matter.

With further reference now to FIGS. 4-5, there is shown exemplary configurations for such displays, including a film structure 1 as previously described in regard to FIG. 1. However, it will be understood that displays can include other film structures 1 depicted or described herein, and variations thereof including sign faces that are curved or contoured.

As shown in FIGS. 4-5, the backlit display 100 includes a box 50 or frame 50, which holds or otherwise supports a sign face 90 comprising a front member 60 and a film structure 1 attached thereto. The film structure 1 is shown to be similar to that depicted in FIG. 1, and may be in the form of a tape or a label that can be selectively removable from the backlit display 100. The film structure 1 can be sized to the desired dimensions by die cutting, laser cutting, or any other known sizing methods. In accordance with the present subject matter, the various embodiments of the film structure 1 depicted in any of FIGS. 1, 2 and 3, and variations and combinations thereof, can be included in the backlit display 100.

In one particular embodiment and as shown in FIG. 4, the film structure 1 is associated with a housing 50, wherein the adhesive layer 30 is adhered to a front member 60 of the housing 50. In several aspects, the front member 60 is translucent or transparent, or substantially so. The adhesive layer 30 is shown to be bonded with the front side 61 of the front member 60. The film structure 1 and front member 60 together comprise the sign face 90 which can be used independently of the housing 50 and illumination source 70, or can be incorporated into other types of assemblies or frames.

The film structure 1 depicted in FIG. 4 is substantially equivalent to that depicted in FIG. 1, absent the release liner 40. That is, the film structure 1 includes a first side 2 and a second side 3. The first side 2 being defined by the first face 23 of the colored layer 20 and the second side 3 of the film structure 1 being defined by the portion of the adhesive layer 30 that is in contact with the front member 60 of the housing 50. The colored layer 20 includes pigment particles 21 dispersed in a material 22, such as a polymer material formed into a thin film. The colored layer 20 has a second face 24 that is oppositely directed from the first face 23. The light-diffusing layer 10 is directly disposed on the second face 24 of the colored layer 20, and comprises light-diffusing particles 11 dispersed in a matrix material 12. The adhesive layer 30 is disposed on a side of the light-diffusing layer 10 opposite from the colored layer 20, and is used for adhering the film structure 1 to the front side 61 of the front member 60.

The housing 50, including the front member 60, defines an interior 51 of the backlit sign box 50. The interior 51 includes an illumination source 70 and defines a depth 54 of the box 50 between a front 52 and a back 53. As shown in FIG. 4, the front member 60 is disposed on the front 52 of the housing 50 and separates the film structure 1 from the illumination source 70. It will also be understood that the present subject matter includes a sign face 90 and/or backlit display 100 in which the film structure 1 is disposed between the front member 60 and the illumination source 70. In other words the film structure 1 could be adhered to the back side 62 of the front member 60 and thereby positioned in the interior 51 of the housing 50.

The light source 70 in FIG. 4 is depicted to comprise an LED array wherein the individual LED's 71 are spaced a distance 72 from one another and collectively define the illumination source 70. It will be understood that by incorporating the film structures 1 into the signbox 50, that the distance 72 between the LED's 71 can be increased over conventional configurations, because the film structure 1 is capable of reducing or eliminating hotspots that may result from such increased spacing 72 between multi-point light sources 71. The illumination source 70 can include one or more of a variety of lights that transmit light at a normal angle to the film structure 1, or at an angle divergent from normal, including side or edge illumination or light waveguided through the film structure 1.

As is understood from FIG. 4, the illumination source 70 and the housing 50 are configured so that light emitting from the illumination source 70 will pass through the front member 60 and the film structure 1 (collectively, the "sign face") in order to exit the interior 51 of the housing 50 to the front 52 of the housing 50. Further, the illumination source 70 can also provide lighting from the side or edge of the light box 50 rather than only from the back 53 of the box 50 through the film structure 1. It will be also be understood that the illumination source 70 can be placed anywhere toward the back side 62 of the front member 60 or toward the second side 3 of the film structure 1 and does not necessarily have to be placed near the rear of the housing 50 as depicted in FIG. 4.

Although the housing 50 (including the front member 60) is shown in FIG. 4 to completely enclose the interior 51, it will be understood that the backlit display 100 does not necessarily have to define an interior 51 that is completely enclosed, but can include a frame 50 or other structure that only partially encloses the interior 51.

In other embodiment, the backlit display 100 can simply include an illumination source 70 and the film structure 1. In this version, the film structure 1 may be without an adhesive layer 30, wherein the colored layer 20 and the light-diffusing layer 10 can be stretched or otherwise arranged in relation to the illumination source 70, such that light from the illumination source 70 passes through the two-in-one film structure 1 to thereby diffuse and color the light.

The film structures 1 in FIGS. 4-5 also include indicia, a communication, or images 83 that are printed, or otherwise applied to the first side 2 of the film structure 1 in order to provide a visual indication 80 to an observer. The printed indicia 83 may be formed by any conventional printing technique or other application technique. The printed indicium 83 is shown to comprise an arrow, but may comprise other forms. For example, it is contemplated that the indicia 83 does not have to be printed directly to the film structure 1, but can be spaced from the film structure 1, and can include a three-dimensional object positioned in front of the sign face 90.

In one aspect, indicia 83 can be formed with a printable ink or paint on the first side 2 of the film structure, such that the printed area 82 having the indicia 83 printed thereon, may appear to an observer as a relatively darker area compared to the unprinted area 81, or may appear to be a different color from the film structure 1; while the unprinted area 81 not having printed indicia 83 thereon, may appear to an observer to be a lighter area compared to the printed area 82, or may appear to be the same color as the film structure 1. For example, the printed area 82 may be more opaque than the unprinted area 81. However, the unprinted area 81 will nevertheless appear colored due to the colored layer 20, and translucent due to the light-diffusing layer 10. The combination of the lighter unprinted areas 81 and the darker printed areas 82, together comprise a visual communication 80 that may be visible to an observer with or without backlit illumination of the sign.

Methods

The present subject matter also provides methods of making a two-in-one colored and translucent film structure 1. The colored and translucent film structure 1 can be used for a backlit display 100 that includes a multi-point illumination source 70, and may effectively reduce or eliminate hot spots on such displays 100.

In one embodiment, such a method includes providing a colored layer 20 as described herein, comprising pigment particles 21 dispersed in a substantially transparent material 22. The pigment particles 21 are a discontinuous phase dispersed in the continuous phase transparent material 22. The pigment particles 21 and transparent material 22 can be those as described herein, such that the colored layer 20 provides a hue to the light transmitted through the film structure 1. The colored layer 20 defines a first face 23 and an oppositely directed second face 24.

The method of making a two-in-one colored and translucent film structure 1 may include arranging light-diffusing particles in a light-diffusing layer 10 as described herein, and over the second face 24 of the colored layer 20. The light-diffusing layer 10 comprises light-diffusing particles 11 dispersed in a matrix 12. In one aspect, the light-diffusing layer 10 is formed or placed directly on the second face 24 of the colored layer 20. As such, the light-diffusing layer 10 directly abuts, or is otherwise in intimate contact with the colored layer 20. In other embodiments, the light-diffusing layer 10 may not directly abut the colored layer 20. In certain aspects, the light-diffusing particles may be dispersed in the colored layer, the adhesive layer, a light-diffusing layer, or combinations thereof as previously described and reflected in FIG. 1-3 or combinations thereof.

Light-diffusing particles 11 included in a light-dispersing layer 10 that is separate and distinct from the colored layer and the adhesive layer, have a refractive index different than a refractive index of the matrix 12, such that light transmitted through the film structure 1 will be sufficiently diffused by the light-diffusing layer 10, and the film structure 1 will sufficiently reduce the appearance of hotspots when used as part of a backlit display 100. In one aspect, the light-diffusing particles 11 have a refractive index that is lower or higher than a refractive index of the matrix material 12.

The method of making a two-in-one colored and translucent film structure 1 includes disposing an adhesive layer 30 on the light-diffusing layer 10 such that the adhesive layer 30 is situated on a side of the light-diffusing layer 10 opposite from the colored layer 20. In one embodiment, the adhesive layer 30 is in intimate contact with, or is directly abutting the light-diffusing layer 10. In one embodiment, the adhesive layer 30 is for adhering the film structure 1 to a substrate, such as a front member 60 of a backlit sign, to form a sign face 90 for the backlit housing 50.

The method of making a colored and translucent film structure 1 can include positioning a release liner 40 over an exposed portion of the adhesive layer 30, such that the adhesive layer 30 is protected from undesired exposure to a substrate or other environmental contamination.

In another embodiment in accordance with the present subject matter, a method of displaying a visual communication 80 is also provided. The method comprises providing an illumination source 70, a colored and translucent film structure 1, and a visual communication 80. The film structure 1 may include a colored layer 20 and a light-diffusing layer 10. The light-diffusing layer 10 includes light-diffusing particles 11 dispersed in a matrix 12. The light-diffusing particles 11 have a refractive index different than a refractive index of the matrix 12. In one embodiment, the light-diffusing layer 10 is free from an adhesive component and as such, the light-diffusing particles 11 may have a refractive index either greater than or less than the refractive index of the matrix material 12 into which they are dispersed. In certain aspects, the light-diffusing particles may be dispersed in the colored layer, the adhesive layer, a light-diffusing layer, or combinations thereof as previously described and reflected in FIG. 1-3 or combinations thereof.

The method of displaying a visual communication 80 includes positioning one of the film structure 1 and the illumination source 70, such that light emitted from the illumination source 70 will transmit through the film structure 1. Light that is transmitted from the illumination source 70 and through the film structure 1 will be colored and sufficiently diffused so as to eliminate or reduce hot spots from the illumination source 70.

The method of displaying a visual communication 80 includes arranging the visual communication 80 in the line of the light that is transmitted from the illumination source 70 and through the film structure, which thereby displays the visual communication 80. This operation can include disposing indicia, a communication, or images 83 directly on the film structure, or spaced therefrom, wherein the indicia, communication, or images 83 will affect the amount or color of light transmitted to an observer.

In one aspect the indicia is partially transparent, wherein the light transmitted through the film structure 1 will illuminate the indicia 83 and will be at least partially transmit therethrough. In another aspect the indicia 83, or portions thereof, are opaque, such that light does not transmit through the opaque portions of the indicia 83 and wherein the light transmitted through the film structure 1 may produce a profile of the indicia 83 as seen by an observer. The indicia, communication, or images 83 can be printed, painted, or otherwise applied directly to the film structure 1, for example on the first face 23 of the colored layer 20 or on other layers of the film structure 1. Alternatively, the indicia 83 may be spaced from the film structure 1 or be included on or in a layer or film that is separate from the film structure 1.

The method of displaying a visual communication 80 can include utilizing a backlit housing 50, wherein the illumination source 70 may be disposed in an interior 51 of the housing 50, and light emanating from the illumination source 70 transmits through a transparent or translucent front member 60. In this aspect, an adhesive layer 30 can be included in the film structure 1, which can be used to bond the film structure 1 with the front member 60 so that light from the illumination source 70 can be transmitted through the film structure 1. In this aspect, the film structure 1 is positioned by bringing the adhesive layer 30 of the film structure 1 into contact with the front member 60 of the housing 50 to thereby adhere the film structure 1 to the front member 60, such that light from the illumination source 70 will transmit through the film structure 1. In one embodiment, the front member 60 is positioned between the film structure 1 and the illumination source 70.

Other additional operations or variations can be incorporated into the exemplary methods.

The present subject matter includes all operable combinations of features and aspects described herein. Thus, for example if one feature is described in association with an embodiment and another feature is described in association with another embodiment, it will be understood that the present subject matter includes embodiments having a combination of these features.

Many other benefits will no doubt become apparent from future application and development of this technology. All patents, applications, standards, and articles noted herein are hereby incorporated by reference in their entirety.

As described hereinabove, the present subject matter addresses many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A translucent colored film structure comprising
a colored layer including pigment particles dispersed in a material, an adhesive layer including an adhesive composition, and light-diffusing particles, wherein at least one of the following is satisfied:
   a) light-diffusing particles are dispersed in a matrix that defines a light-diffusing layer that is free of an intentionally added adhesive component and that is separate and distinct from both the colored layer and the adhesive layer, the light-diffusing particles dispersed in the matrix of the light-diffusing layer having a refractive index that is different from the matrix;
   b) light-diffusing particles are dispersed in the colored layer, the light-diffusing particles dispersed in the colored layer having a refractive index that is lower than the material;
   c) light-diffusing particles are dispersed in the adhesive layer, the light-diffusing particles dispersed in the adhesive layer having a refractive index that is higher than the adhesive composition.

2. The film structure of claim 1, wherein a) is satisfied and the light-diffusing particles dispersed in the matrix of the light-diffusing layer have a refractive index of from about 1.0 to about 1.5.

3. The film structure of claim 1, wherein a) is satisfied and the light-diffusing particles dispersed in the matrix of the light-diffusing layer have a refractive index of from about 1.6 to about 2.8.

4. The film structure of claim 1, wherein a) is satisfied and the light-diffusing particles dispersed in the matrix of the light-diffusing layer include a first group of light-diffusing particles and a second group of light diffusing particles, the first group of light-diffusing particles having a refractive index of from about 1.0 to about 1.5 and the second group of light-diffusing particles having a refractive index of from about 1.6 to about 2.8.

5. The film structure of claim 1, wherein b) is satisfied and the light-diffusing particles dispersed in the colored layer have a refractive index of from about 1.0 to about 1.5.

6. The film structure of claim 1, wherein c) is satisfied and the light-diffusing particles dispersed in the adhesive layer have a refractive index of from about 1.6 to about 2.8.

7. The film structure of claim 2, wherein the light-diffusing particles having an index of refraction from about 1.0 to about 1.5 comprise particles selected from the group consisting of silicone-containing particles, polytetrafluoroethylene-containing particles, hollow particles, or combinations thereof.

8. The film structure of claim 3, wherein the light-diffusing particles having an index of refraction from about 1.6 to about 2.8 comprise one selected from the group consisting of $TiO_2$, $SiO_2$, $CaCO_3$, $BaSO_4$, and combinations thereof.

9. The film structure of claim 1, wherein only a) is satisfied.

10. The film structure of claim 1, wherein the film structure includes a light-diffusing layer disposed between the colored layer and the adhesive layer.

11. The film structure of claim 1, wherein the adhesive layer is configured for adhering the film structure to a substrate.

12. The film structure of claim 1, further including a release liner removably covering the adhesive layer.

13. The film structure of claim 1, wherein the matrix of the light-diffusing layer comprises PVC.

14. The film structure of claim 1, wherein the material of the colored layer comprises PVC.

15. The film structure of claim 1, wherein a difference between the refractive index of the light-diffusing particles dispersed in the matrix and the refractive index of the matrix is at least 0.5.

16. The film structure of claim 1, wherein the light-diffusing particles have a median largest dimension of from about 0.1 μm to about 3 μm.

17. The film structure of claim 1, wherein the pigment particles have a median largest dimension of from about 0.1 μm to about 3 μm.

18. The film structure of claim 1, wherein the light-diffusing particles comprise particles that are white, black, optically clear, a shade between white and black, or combinations thereof.

19. A sign face comprising:
a transparent or translucent substrate, and
a film structure adhered to the substrate, the film structure including a colored layer comprising pigment particles dispersed in a substantially transparent material, an adhesive layer including a substantially transparent adhesive composition, the adhesive layer bonding the film structure to the substrate, and light-diffusing particles, wherein at least one of the following is satisfied:
   a) light-diffusing particles are included in a matrix that defines a light-diffusing layer that is free of an intentionally added adhesive component and is separate and distinct from both the colored layer and the adhesive layer, the light-diffusing particles dispersed in the matrix of the light-diffusing layer having a refractive index that is different from the matrix;
   b) light-diffusing particles are dispersed in the colored layer, the light-diffusing particles dispersed in the colored layer having a refractive index that is lower than the material;
   c) light-diffusing particles are dispersed in the adhesive layer, the light-diffusing particles dispersed in the adhesive layer having a refractive index that is higher than the adhesive composition.

20. The sign face of claim 19, wherein a) is satisfied and the light-diffusing particles dispersed in the matrix of the light-diffusing layer have a refractive index of from about 1.0 to about 1.5.

21. The sign face of claim 19, wherein a) is satisfied and the light-diffusing particles dispersed in the matrix of the light-diffusing layer have a refractive index of from about 1.6 to about 2.8.

22. The sign face of claim 19, wherein a) is satisfied and the light-diffusing particles dispersed in the matrix of the light-diffusing layer include a first group of light-diffusing particles and a second group of light diffusing particles, the first group of light-diffusing particles having a refractive index of from about 1.0 to about 1.5 and the second group of light-diffusing particles having a refractive index of from about 1.6 to about 2.8.

23. The sign face of claim 19, wherein b) is satisfied and the light-diffusing particles dispersed in the colored layer have a refractive index of from about 1.0 to about 1.5.

24. The sign face of claim 19, wherein c) is satisfied and the light-diffusing particles dispersed in the adhesive layer have a refractive index of from about 1.6 to about 2.8.

25. The sign face of claim 20, wherein the light-diffusing particles having an index of refraction from about 1.0 to about 1.5 comprise particles selected from the group consisting of silicone-containing particles, polytetrafluoroethylene-containing particles, hollow particles, or combinations thereof.

26. The sign face of claim 21, wherein the light-diffusing particles having an index of refraction from about 1.6 to about 2.8 comprise one selected from the group consisting of $TiO_2$, $SiO_2$, $CaCO_3$, $BaSO_4$, and combinations thereof.

27. The sign face of claim 19, wherein only a) is satisfied.

28. The sign face of claim 19, wherein the film structure includes a light-diffusing layer disposed between the colored layer and the adhesive layer.

29. The sign face of claim 19, wherein the matrix of the light-diffusing layer comprises PVC.

30. The sign face of claim 19, wherein the material of the colored layer comprises PVC.

31. The sign face of claim 19, wherein the light-diffusing particles have a median largest dimension of from about 0.1 µm to about 3 µm.

32. The sign face of claim 19, wherein the pigment particles have a median largest dimension of from about 0.1 µm to about 3 µm.

33. The sign face of claim 19, wherein the light-diffusing particles comprise particles that are white, black, optically clear, a shade between white and black, or combinations thereof.

34. A backlit sign comprising:
a frame including a transparent or translucent member, and an illumination source disposed at a back side of the member and configured to transmit light through the member, and
a film structure including a translucent colored layer, an adhesive layer bonding the film structure to the member, and light-diffusing particles, wherein at least one of the following is satisfied:
a) light-diffusing particles are included in a matrix that defines a light-diffusing layer that is free of an intentionally added adhesive component and is separate and distinct from both the colored layer and the adhesive layer, the light-diffusing particles dispersed in the matrix of the light-diffusing layer having a refractive index that is different from the matrix;
b) light-diffusing particles are dispersed in the colored layer, the light-diffusing particles dispersed in the colored layer having a refractive index that is lower than the material;
c) light-diffusing particles are dispersed in the adhesive layer, the light-diffusing particles dispersed in the adhesive layer having a refractive index that is higher than the adhesive composition.

35. The backlit sign of claim 34, wherein a) is satisfied and the light-diffusing particles dispersed in the matrix of the light-diffusing layer have a refractive index of from about 1.0 to about 1.5.

36. The backlit sign of claim 34, wherein a) is satisfied and the light-diffusing particles dispersed in the matrix of the light-diffusing layer have a refractive index of from about 1.6 to about 2.8.

37. The backlit sign of claim 34, wherein a) is satisfied and the light-diffusing particles dispersed in the matrix of the light-diffusing layer include a first group of light-diffusing particles and a second group of light diffusing particles, the first group of light-diffusing particles having a refractive index of from about 1.0 to about 1.5 and the second group of light-diffusing particles having a refractive index of from about 1.6 to about 2.8 wherein.

38. The backlit sign of claim 34, wherein b) is satisfied and the light-diffusing particles dispersed in the colored layer have a refractive index of from about 1.0 to about 1.5.

39. The backlit sign of claim 34, wherein c) is satisfied and the light-diffusing particles dispersed in the adhesive layer have a refractive index of from about 1.6 to about 2.8.

40. The backlit sign of claim 35, wherein the light-diffusing particles having an index of refraction from about 1.0 to about 1.5 comprise particles selected from the group consisting of silicone-containing particles, polytetrafluoroethylene-containing particles, hollow particles, or combinations thereof.

41. The backlit sign of claim 36, wherein the light-diffusing particles having an index of refraction from about 1.6 to about 2.8 comprise one selected from the group consisting of $TiO_2$, $SiO_2$, $CaCO_3$, $BaSO_4$, and combinations thereof.

42. The backlit sign of claim 34, wherein only a) is satisfied.

43. The backlit sign of claim 34, wherein the film structure includes a light-diffusing layer disposed between the colored layer and the adhesive layer.

44. The backlit sign of claim 34, wherein the matrix of the light-diffusing layer comprises PVC.

45. The backlit sign of claim 34, wherein the material of the colored layer comprises PVC.

46. The backlit sign of claim 34, wherein the light-diffusing particles have a median largest dimension of from about 0.1 µm to about 3 µm.

47. The backlit sign of claim 34, wherein the pigment particles have a median largest dimension of from about 0.1 µm to about 3 µm.

48. The backlit sign of claim 34, wherein the light-diffusing particles comprise particles that are white, black, optically clear, a shade between white and black, or combinations thereof.

49. The backlit sign of claim 34, wherein the illumination source comprises one or more light emitting diodes.

50. The backlit sign of claim 34, wherein the frame comprises a housing, the member defines a front of the housing, and the illumination source is disposed inside the housing.

51. A method of making a colored and translucent film structure, the method including:
providing a colored layer comprising pigment particles dispersed in a substantially transparent material, the colored layer defining a first face and an oppositely directed second face;
disposing an adhesive layer comprising an adhesive composition on a side of the colored layer nearest the second face of the colored layer, the adhesive layer being configured to adhere the film structure to a substrate;
incorporating light-diffusing particles into at least one of the following:
a) a matrix to thereby define a light-diffusing layer that is free of an intentionally added adhesive component and is disposed on the second face of the colored layer between the colored layer and the adhesive layer, wherein the light-diffusing particles dispersed in the matrix of the light-diffusing layer have a refractive index that is different from the matrix,
b) the colored layer, wherein the light-diffusing particles dispersed in the colored layer have a refractive index that is lower than the material, c) the adhesive layer, wherein the light-diffusing particles dispersed in the adhesive layer have a refractive index that is higher than the adhesive composition.

52. The method of claim 51, further including positioning a release liner over an exposed portion of the adhesive layer.

53. The method of claim 51, wherein the pigment particles have a median largest dimension of from about 0.1 μm to about 3 μm and the material comprises PVC.

54. The method of claim 51, wherein a) is satisfied and the light-diffusing particles dispersed in the matrix of the light-diffusing layer have a refractive index of from about 1.0 to about 1.5.

55. The method of claim 51, wherein a) is satisfied and the light-diffusing particles dispersed in the matrix of the light-diffusing layer have a refractive index of from about 1.6 to about 2.8.

56. The method of claim 51, wherein b) is satisfied and the light-diffusing particles dispersed in the colored layer have a refractive index of from about 1.0 to about 1.5.

57. The method of claim 51, wherein c) is satisfied and the light-diffusing particles dispersed in the adhesive layer have a refractive index of from about 1.6 to about 2.8.

58. The method of claim 43, wherein the light-diffusing particles have a median largest dimension of from about 0.1 μm to about 3 μm.

59. A method of displaying a visual communication comprising:
providing an illumination source, a film structure, and a visual communication, the film structure comprising a colored layer including pigment particles dispersed in a material, an optional adhesive layer including an adhesive composition, and light-diffusing particles wherein at least one of the following is satisfied:
a) light-diffusing particles are included in a matrix that defines a light-diffusing layer that is free of an intentionally added adhesive component and is separate and distinct from both the colored layer and the optional adhesive layer, the light-diffusing particles dispersed in the matrix of the light-diffusing layer having a refractive index that is different from the matrix;
b) light-diffusing particles are dispersed in the colored layer, the light-diffusing particles dispersed in the colored layer having a refractive index that is lower than the material;
c) the film structure includes an adhesive layer and light-diffusing particles are dispersed in the adhesive layer, the light-diffusing particles dispersed in the adhesive layer having a refractive index that is higher than the adhesive composition;
positioning one of the film structure and the illumination source such that light from the illumination source will transmit through the film structure; and
arranging the communication in line of light transmitted through the film structure to thereby display the communication.

60. The method of claim 59, wherein the illumination source is disposed in a housing including a front member, the illumination source configured to transmit light through the front member of the housing.

61. The method of claim 60, wherein:
the film structure includes an adhesive layer, and
positioning comprises bringing the adhesive layer of the film structure into contact with the front member of the housing to thereby attach the film structure to the front member.

62. The method of claim 59, wherein at least a portion of the communication is disposed directly on the film structure.

63. The method of claim 59, wherein the visual communication comprises printed indicia.

64. The method of claim 60, wherein the front member is situated between the illumination source and the film structure.

65. The method of claim 60, wherein the material of the colored layer comprises PVC and the pigment particles have a median largest dimension of from about 0.1 μm to about 3 μm.

66. The method of claim 59, wherein the light-diffusing layer is disposed between the colored layer and the adhesive layer.

67. The method of claim 59, wherein a) is satisfied and the light-diffusing particles dispersed in the matrix of the light-diffusing layer have a refractive index of from about 1.0 to about 1.5.

68. The method of claim 59, wherein a) is satisfied and the light-diffusing particles dispersed in the matrix of the light-diffusing layer have a refractive index of from about 1.6 to about 2.8.

69. The method of claim 59, wherein b) is satisfied and the light-diffusing particles dispersed in the colored layer have a refractive index of from about 1.0 to about 1.5.

70. The method of claim 59, wherein c) is satisfied and the light-diffusing particles dispersed in the adhesive layer have a refractive index of from about 1.6 to about 2.8.

71. The method of claim 67, wherein the light-diffusing particles having a refractive index of from about 1.0 to about 1.5 comprise particles selected from the group consisting of silicone-containing particles, polytetrafluoroethylene-containing particles, hollow particles, or combinations thereof.

72. The method of claim 68, wherein the light-diffusing particles having a refractive index of from about 1.6 to about 208 comprise particles selected from the group consisting of $TiO_2$, $SiO_2$, $CaCO_3$, $BaSO_4$, and combinations thereof.

73. The method of claim 59, wherein the matrix of the light-diffusing layer comprises PVC.

74. The method of claim 59, wherein the light-diffusing particles have a median largest dimension of from about 0.1 μm to about 3 μm.

75. The method of claim 59, wherein the illumination source comprises one or more light emitting diodes.

* * * * *